April 22, 1924.
E. A. CHASE
STONE FINISHING MACHINE
Filed March 29, 1921
1,491,515
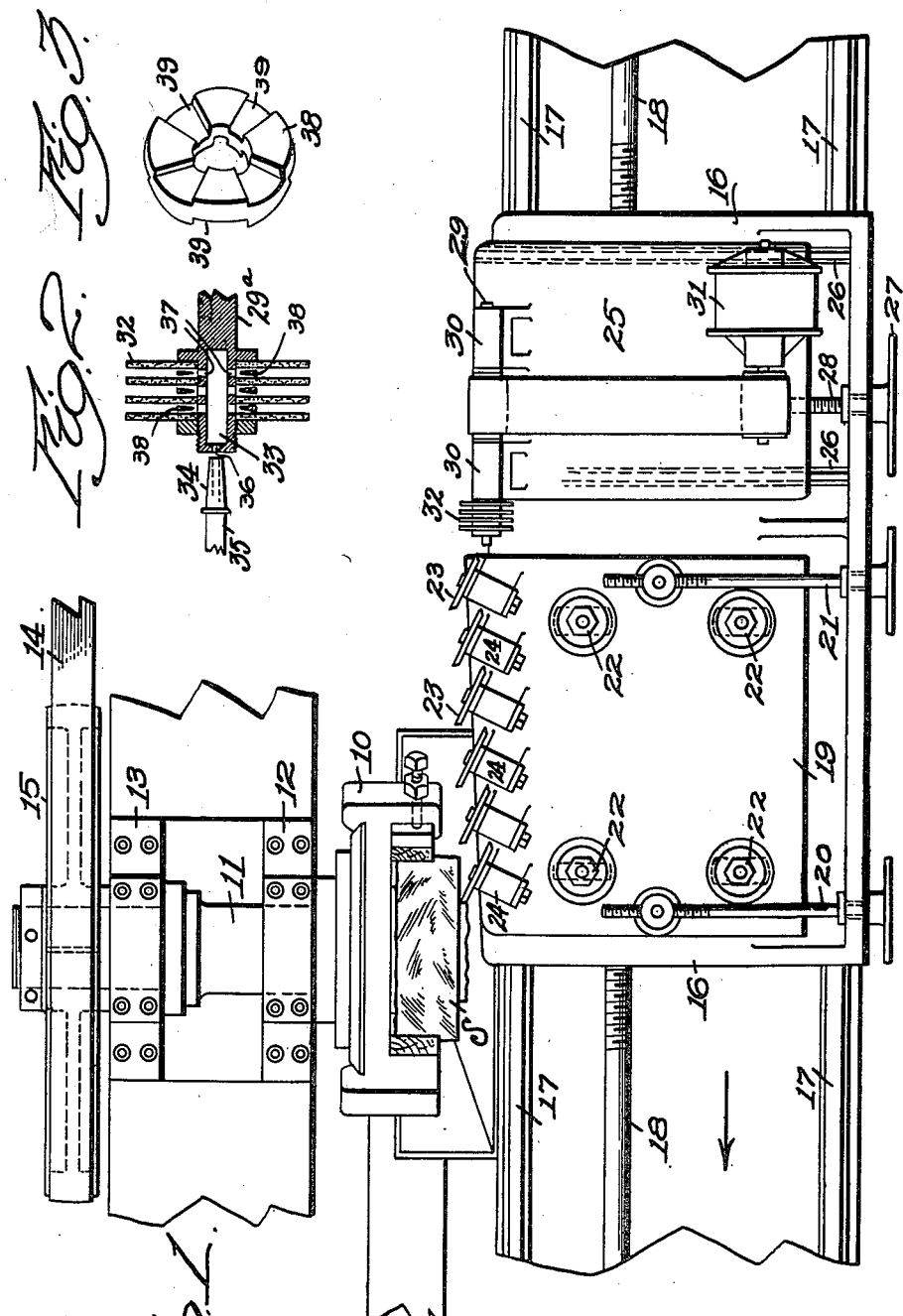

Patented Apr. 22, 1924.

1,491,515

UNITED STATES PATENT OFFICE.

ELROY A. CHASE, OF NORTHFIELD, VERMONT.

STONE-FINISHING MACHINE.

Application filed March 29, 1921. Serial No. 456,669.

*To all whom it may concern:*

Be it known that I, ELROY A. CHASE, a citizen of the United States, residing at Northfield, in the county of Washington and State of Vermont, have invented a new and useful Stone-Finishing Machine, of which the following is a specification.

This invention relates to a stone finishing machine and particularly to mechanism for providing a ground or polished surface on a block of granite or other stone. This application is, in part, a continuation of my prior application #384,246, filed May 26, 1920, and discloses the grinding mechanism therein shown, together with a modification thereof.

It is the object of my invention as claimed herein to provide mechanism for quickly and economically producing a ground or polished surface on a block of cut granite, avoiding expensive hand operations, and greatly reducing the cost of production.

With this general object in view, an important feature of my invention relates to the provision of means for producing a finished surface on a block of granite or other stone by the successive operation of a plurality of relatively thin grinding discs.

Other features of my invention relate to means for supporting and rotating the stone during the grinding or finishing operation, and to novel means for applying water to the grinding wheels in such manner that very smooth and cool grinding is attained.

My invention further relates to arrangements and combinations of parts which will be hereinafter described and more particularly pointed out in the appended claims.

A preferred form of my invention is shown in the drawings in which—

Fig. 1 is a plan view of my improved finishing machine;

Fig. 2 is a sectional elevation of a modification; and

Fig. 3 is a perspective view of one of the spacing washers used in the modification.

Referring to the drawings, I have shown a machine in which a block of stone may be continuously rotated while it is acted upon successively by a series of stone cutting devices and by a series of grinding wheels or discs. The stone S is preferably held in a chuck 10 mounted on the end of a heavy shaft or spindle 11 rotatable in fixed bearings 12 and 13 and driven in any convenient manner as by a belt 14 and pulley 15.

A carriage 16 is mounted for movement across the face of the stone on guide ways 17, the carriage being actuated by a feed screw 18 connected to driving mechanism not shown. A table 19 is movable transversely of the carriage 16 toward and from the face of the block S. Adjusting screws 20 and 21 are provided for thus moving the table across the carriage and the table is held in adjusted position on the carriage by clamping bolts 22.

The cutting operation is preferably performed by a series of freely rotatable cutting discs 23 mounted in bearings 24 on the plate 19 and having their axes inclined to the axes of the shaft 11.

A grinding table 25 is also mounted for transverse adjustment on guide ways 26 on the carriage 16 and may be adjusted thereon by a hand wheel 27 and adjusting screw 28. A grinding spindle 29 is mounted in bearings 30 on the grinding table 25 and may be belt driven from a motor 31, also preferably mounted on the table 25. The grinding operation is performed by a series of thin grinding wheels or discs 32 mounted in spaced relation on the spindle 29.

With the mechanism above described, a single passage of the carriage 16 across the face of the stone S causes the cutters 23 to act successively upon the stone, removing successive thin layers of stone in such manner that the last cutter provides a smoothly cut surface upon which the grinding discs 32 then operate successively to produce a fine ground or polished finish.

The use of a plurality of thin discs possesses important advantages over the use of a single wheel of broader face. The thin discs possess some slight degree of elasticity and they are also more easily cooled and more easily free themselves from the waste material removed from the face of the stone.

It is essential that water should be supplied to the grinding wheels in a generous quantity during the grinding operation and I have found that this can be done to advantage by means of the construction shown in the modification of Figs. 2 and 3.

In this construction, the wheel spindle 29$^a$ is provided with a recess or chamber 33 adapted to receive water from a nozzle 34 connected by a pipe 35 to any suitable source of water supply, the water being preferably introduced into the chamber 33 through a restricted opening 36. Transverse openings 37 are also provided in the side walls of the chamber 33 and the grinding discs 32 are spaced apart by washers 38 (Fig. 3) having radial openings 39 through which water may escape from the chamber 33 in close proximity to the side faces of the discs 32.

By the use of this form of spindle the grinding discs are effectively cooled and the necessary amount of water is at all times available.

Having thus described my invention, it will be evident that changes and modifications can be made therein by those skilled in the art within the spirit and scope of my invention as set forth in the claims and I do not wish to be otherwise limited to the details herein disclosed but what I claim is:—

1. A stone finishing machine having, in combination, a work driving shaft, bearings to support said shaft in horizontal position, means to rotate said shaft at a relatively slow speed, a chuck on said shaft effective to grip and hold a block of stone at one end of said shaft for rotation in a vertical plane, a tool support movable horizontally across the end of said shaft, means to move said support, a grinding shaft rotatably mounted on said support, means to rotate said grinding shaft at a relatively high speed, a plurality of small thin flexible grinding wheels mounted in spaced relation on said grinding shaft and means to cool said wheels during the grinding operation.

2. In a stone-finishing machine, a grinding shaft having a chamber, means to supply water to said chamber, said chamber having openings in its cylindrical wall, a plurality of relatively thin grinding discs mounted on said shaft, and spacing washers disposed on said shaft between said discs, said washers having passages through which water escaping through the openings from said chamber is directed to the side faces of said discs.

3. In a stone-finishing machine, a grinding shaft, a plurality of relatively thin grinding discs mounted on said shaft, spacing washers separating said discs, said washers having openings in their side faces, and means to supply water to said openings from within said wheels and washers.

4. In a stone-finishing machine, a grinding shaft, a plurality of relatively thin grinding discs mounted in spaced relation on said shaft, and means for supplying water to the side faces of each of said grinding discs to be distributed thereon by centrifugal force.

In testimony whereof I have hereunto affixed my signature.

ELROY A. CHASE.